US010942562B2

(12) United States Patent
Qawami et al.

(10) Patent No.: US 10,942,562 B2
(45) Date of Patent: Mar. 9, 2021

(54) METHODS AND APPARATUS TO MANAGE OPERATION OF VARIABLE-STATE COMPUTING DEVICES USING ARTIFICIAL INTELLIGENCE

(71) Applicant: Intel Corporation, Santa Clara, CA (US)

(72) Inventors: Shekoufeh Qawami, El Dorado Hills, CA (US); Nageen Himayat, Fremont, CA (US); Chaitanya Sreerama, Hillsboro, OR (US); Hassnaa Moustafa, Portland, OR (US); Rita Wouhaybi, Portland, OR (US); Linda Hurd, Cool, CA (US); Nadine L Dabby, Palo Alto, CA (US); Van Le, Beaverton, OR (US); Gayathri Jeganmohan, Folsom, CA (US); Ankitha Chandran, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 85 days.

(21) Appl. No.: 16/146,454

(22) Filed: Sep. 28, 2018

(65) Prior Publication Data
US 2019/0050049 A1     Feb. 14, 2019

(51) Int. Cl.
*G06F 1/00*       (2006.01)
*G06F 1/3296*     (2019.01)
(Continued)

(52) U.S. Cl.
CPC ............ *G06F 1/3296* (2013.01); *G06F 1/324* (2013.01); *G06F 1/3206* (2013.01);
(Continued)

(58) Field of Classification Search
CPC ..................................................... G06F 1/3293
See application file for complete search history.

(56) References Cited

U.S. PATENT DOCUMENTS

| 9,749,528 B1 | 8/2017 | Fink et al. | |
| 2008/0169914 A1* | 7/2008 | Albertson | B60W 50/14 340/438 |

(Continued)

FOREIGN PATENT DOCUMENTS

WO    2017123334    7/2017

OTHER PUBLICATIONS

European Patent Office, "Extended European Search Report" issued in connection with European patent application No. 19182450.7, dated Jan. 8, 2020, (11 pages).

*Primary Examiner* — Mohammed H Rehman
(74) *Attorney, Agent, or Firm* — Hanley, Flight & Zimmerman, LLC

(57) ABSTRACT

Methods and apparatus to manage operation of variable-state computing devices using artificial intelligence are disclosed. An example computing device includes a hardware platform. The example computing device also includes an artificial intelligence (AI) engine to: determine a context of the device; and adjust an operation of the hardware platform based on an expected change in the context of the device. The adjustment modifies at least one of a computational efficiency of the device, a power efficiency of the device, or a memory response time of the device.

25 Claims, 10 Drawing Sheets

(51) Int. Cl.
  *G06F 1/3212*  (2019.01)
  *G06F 1/324*  (2019.01)
  *G06T 15/00*  (2011.01)
  *G06K 9/00*  (2006.01)
  *G06N 5/04*  (2006.01)
  *G06N 20/00*  (2019.01)
  *G06F 1/3234*  (2019.01)
  *G06F 1/3206*  (2019.01)

(52) U.S. Cl.
  CPC .......... *G06F 1/3212* (2013.01); *G06F 1/3234* (2013.01); *G06K 9/00718* (2013.01); *G06N 5/04* (2013.01); *G06N 20/00* (2019.01); *G06T 15/005* (2013.01)

(56) References Cited

U.S. PATENT DOCUMENTS

| | | | |
|---|---|---|---|
| 2013/0297090 A1* | 11/2013 | Lelkens | H02J 3/14 700/295 |
| 2014/0208151 A1* | 7/2014 | Fernandez | G05B 19/4063 714/2 |
| 2016/0283284 A1 | 9/2016 | Sun et al. | |
| 2018/0036448 A1* | 2/2018 | Becker | A61L 9/032 |
| 2018/0082436 A1* | 3/2018 | Hattori | G06T 1/60 |
| 2018/0150123 A1 | 5/2018 | HomChaudhuri et al. | |
| 2018/0165576 A1 | 6/2018 | Latapie et al. | |

* cited by examiner

METHODS AND APPARATUS TO MANAGE OPERATION OF VARIABLE-STATE COMPUTING DEVICES USING ARTIFICIAL INTELLIGENCE

FIELD OF THE DISCLOSURE

This disclosure relates generally to artificial intelligence and, more particularly, to methods and apparatus to manage operation of variable-state computing devices using artificial intelligence.

BACKGROUND

A tremendous amount of research is going into advancing the technological field of artificial intelligence. As technology improves, the applications and capabilities of AI have expanded significantly.

BRIEF DESCRIPTION OF THE DRAWINGS

In general, the same reference numbers will be used throughout the drawing(s) and accompanying written description to refer to the same or like parts.

DETAILED DESCRIPTION

Figure 1:
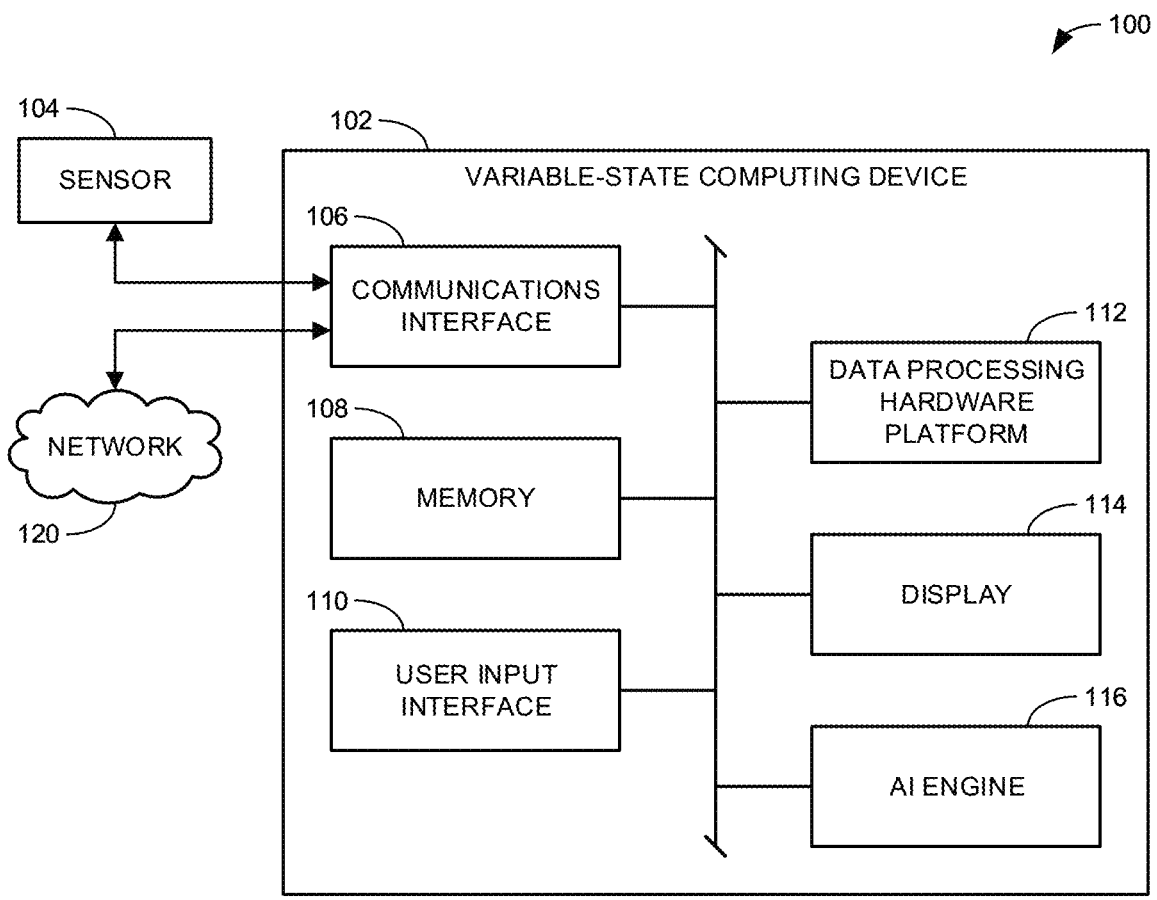
FIG. 1 is a block diagram of an example system that includes a variable-state computing device constructed in accordance with teachings disclosed herein.

Examples disclosed herein involve the implementation of an artificial intelligence (AI) engine to control the operation of hardware components of a device so as to improve (e.g., optimize) the efficiency of the device with respect to the particular context in which the device is operating. In some examples, the AI engine is used to determine or infer the context of the device and to then determine suitable operational parameters for the components of the hardware associated with the device. As used herein, the context of a device is based on the nature (e.g., workload) and/or type of activity or activities in which the device is engaging or is to engage, the nature and/or type of data being processed or to be processed in association with such activities, the purpose of the device activities in processing the data, characteristics of the environment surrounding the device, characteristics and/or preferences of a user of the device, performance capabilities of the components of the device, and/or any other aspect of the operation of the device, the device itself, and/or its surrounding environment that may be known to the AI engine. As used herein, an activity of a device refers to any operation or function performed by one or more hardware components of the device. In some examples, the same hardware operation may be associated with different device activities if the hardware operation is activated in connection with different software applications.

For example, a particular device activity may include a graphics engine rendering a video for display via a display screen. The particular context of the device in such an example is, thus, associated with the activity of rendering a video. An operational parameter that the AI engine may control in such an example is the resolution of the video rendered by the graphics engine. The context of the device may be further defined based on whether the video is associated with a video game, a movie streamed from an online video streaming service, or associated with a feed from a surveillance camera. Further, the context of the device may be informed by the particular content of the media such as, for example, a sporting event where individual players are relatively small such that a high-resolution rendering would enhance the viewers experience as compared with video of a person giving a speech or lecture who substantially fills the screen such that high-resolution is less important and/or even undesirable. Furthermore, the context of the device may vary depending on the purpose of the video. For example, in the surveillance context, the purpose of the video feed may be to detect movement (which would not require very high resolution), as compared with a system intended to detect the presence of a person in the captured scene (which would require moderately high resolution), as compared with a system intended to uniquely identify a person in the captured scene (which would require relatively high resolution). An example characteristic of the surrounding environment that may impact the context of the device displaying the video may include the lighting of the room in which the device is displaying the video. Further, the context of the device may be based on characteristics or preferences of the user such as, for example, a preference to conserve battery life over performance efficiency or vice versa. In some examples, user preferences and/or characteristics may be provided by the user via a user interface. In other example, the AI engine may infer the user preferences and/or characteristics by monitoring and learning the user's behavior over time.

Over time, the AI engine learns the particular operations and interactions of the device hardware and the type(s) of context that commonly occur to more accurately identify the context of the device in new situations. Similarly, over time the AI engine learns how to adjust or tune operational parameters associated with the device hardware based on any particular context to enable the device to function in a manner that provides a satisfying user experience while also achieving one or more target metrics such as, for example, power efficiency, computational efficiency, memory (cache versus storage) response time, etc. Thus, examples disclosed herein are not limited to adjusting the operation of a graphics engine but may apply to any hardware platform and may involve any suitable adjustment to its operation. As some examples, the AI engine may cause a hardware platform to locate data, turn on or off a component of the platform (e.g., a processor core, a memory bank, etc.), initialize a processor core, purge data from memory, start a virtual machine, terminate a virtual machine, move data between memories, and so forth.

Many users perform commonly repeated tasks with their computing devices via particular device activities and/or a combination or series of particular device activities. In some disclosed examples, individual device activities and/or particular combinations and/or patterns of device activities are classified as different operational states of the device. Accordingly, example devices are sometimes referred to herein as variable-state computing devices to indicate that the device may transition between different states (corresponding to one or more different device activities) that are separately identifiable or unique to a user. In some examples, a single device activity may correspond to a particular device state. In some examples, a combination of device activities may correspond to a particular device state. In some examples, the AI engine is able to learn the different states of a particular device and how such states relate to one another based on the flow of operations of the device as it transitions from one state to another. In some examples, the AI engine generates a profile or signature for the device to represent these relationships including the probabilities of the transitions between different ones of the states. Further, the AI engine may learn and/or determine suitable operational parameters for the device hardware to improve (e.g., optimize) the efficiency of the device when operating in the context of one or more of the identified states as mentioned above. Furthermore, by generating a device profile that defines probabilities of transitions between different states, the AI engine may predict future states of the device. Based on these predictions, the AI engine may anticipate changes in hardware requirements based on the operational parameters defined for the current state and the future predicted state(s) to further improve (e.g., optimize) the efficiency of the device as it transitions from one state to another. Furthermore, in some examples, the device profile is used to change or improve (e.g., optimize) the design of the hardware for new devices expected to experience similar states.

FIG. 1 is a block diagram of an example system 100 that includes a variable-state computing device 102 and a sensor 104. In the illustrated example, the sensor 104 is shown external to the device 102. In other examples, the sensor 104 may be integrated with the device 102 such that the example system 100 corresponds to a single device (e.g., a smartphone, a tablet, a laptop computer, etc.). In other examples, the system 100 may include multiple interconnected devices 102 operated by a main control system (e.g., a desktop computer with various peripherals). Further, the device 102 in the example system 100 may be a user-interfacing device that is used locally by an end user, and/or the device 102 may involve a cloud-based implementation (e.g., a server at a datacenter) that is accessed by one or more users via a network (e.g., the Internet).

As used herein, the phrase "variable-state" used to describe the example device 102 refers to the capability of the device 102 to engage in or implement different activities, operations, and/or functions associated with different states at different points in time as outlined above. These different states for the example device 102 may be associated with the operation of one or more of an example communications interface 106, an example memory 108, an example user input interface 110, an example data processing hardware platform 112, an example display 114, and/or an example artificial intelligence (AI) engine 116.

In some examples, the communications interface 106 receives sensor data from the sensor 104. The sensor data provides context for the operations of the device 102. In some examples, the sensor data includes a primary set of data to be processed by the device 102. For example, the device 102 may be associated with a video surveillance system with the sensor 104 corresponding to a camera capturing a video feed to be processed by the device 102. In some examples, the sensor data includes an ancillary set of data that provides additional context for the device 102. For example, the sensor data may indicate the conditions or characteristics of the environment surrounding the device 102 (e.g., temperature, lighting, etc.).

In some examples, the system 100 includes multiple sensors 104 that may provide one or more type(s) of sensor data indicative of the context of the system. Sensor data collected for the one or more sensors 104 is stored in the memory 108. In some examples, the sensor 104 is omitted from the system. Additionally or alternatively, the communications interface 106 may receive data from other devices that provide context for the example device 102. In some examples, these other devices may communicate directly with the communications interface 106 (via either a wired or wireless connection) as with the sensor 104 shown in FIG. 1. In other examples, these other devices may communicate with the communications interface 106 via a network 120.

In the illustrated example of FIG. 1, the user input interface 110 obtains input from a user of the device 102. In some examples, the user input data is indicative of the context of the device and/or its operation. In some examples, the context may be based on preferences and/or instructions specified by the user and/or user input data. In some examples, the context may be based on the actions and/or behaviors of the user as indicated by the user input data. The user input data may be stored in the memory 108.

The example device 102 of FIG. 1 is provided with the data processing hardware platform 112 to process data and/or perform any suitable functions and/or operations. Thus, the hardware platform 112 represents some or all of the core computational circuitry of the device 102. As such, in some examples, the different activities performed by the device 102 that correspond to the different states of the variable state computing device 102 are based on the operation of the hardware platform 112. However, different device states may also depend on the operation of other ones of the components shown in FIG. 1.

Figure 2:
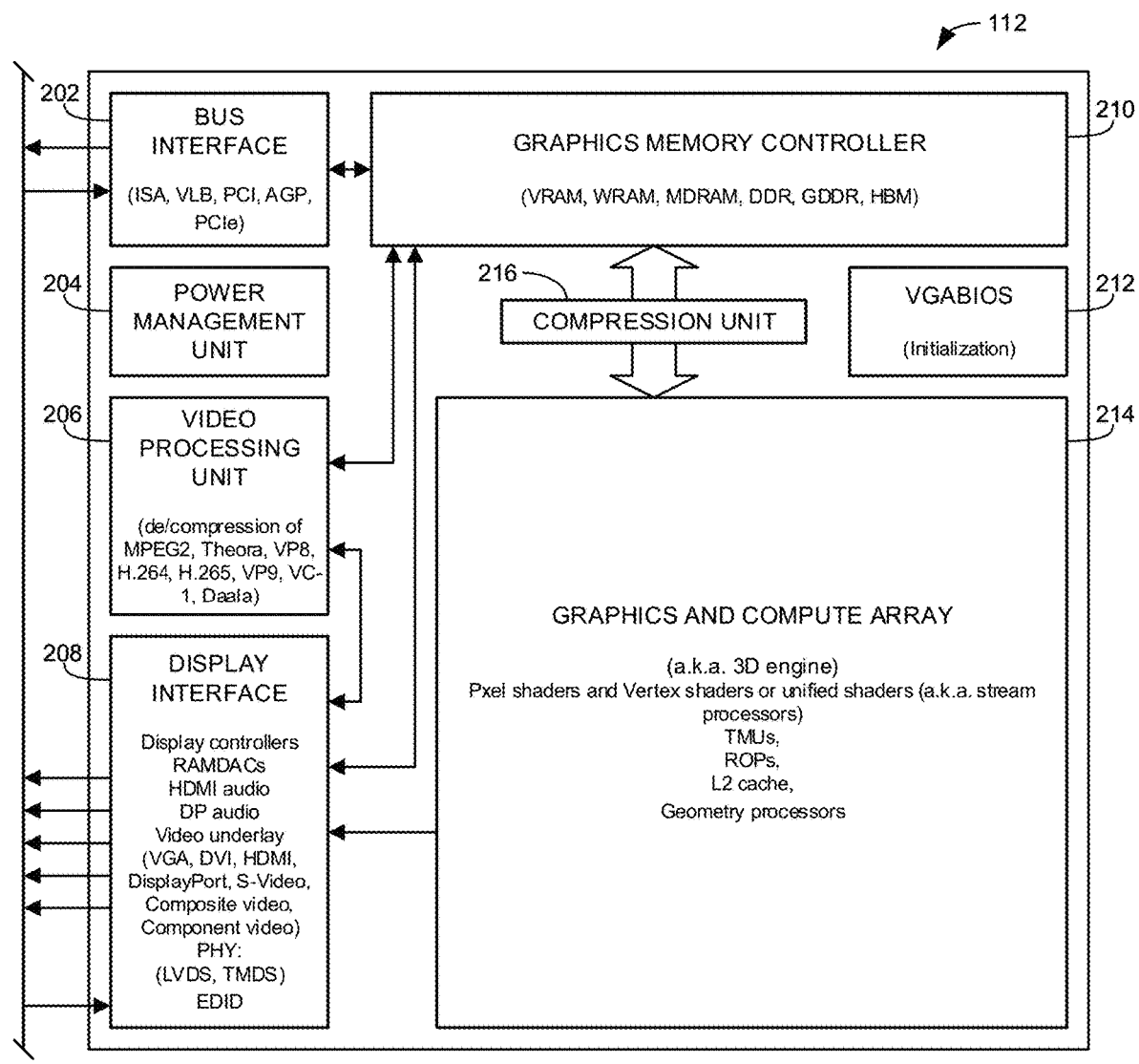
FIG. 2 is a block diagram illustrating an example implementation of the example data processing hardware platform of FIG. 1.

In some examples, the hardware platform 112 is implemented on a single integrated circuit (IC) chip. In other examples, the hardware platform 112 may include multiple IC chips. The hardware platform 112 may include a central processing unit (CPU), a graphics engine, and/or any other suitable hardware engine. As a specific example, FIG. 2 is a block diagram illustrating an example implementation of the data processing hardware platform 112 of FIG. 1. In the example of FIG. 2, the hardware platform 112 is implemented by a graphics engine 112. As shown in FIG. 2, the example graphics engine 112 of this example includes a bus interface 202, a power management unit 204, a video processing unit 206, a display interface 208, a graphics memory controller 210, a video basic input/output system (BIOS) 212, a graphics and compute array 214, and a compression unit 216. In some examples, different ones of the blocks shown in FIG. 2 and/or sub-components of the blocks may be activated or in operation while others are inactive. As a specific example, the graphics and compute array 214 includes an array of separate compute elements that may or may not be operating while the graphics engine 112 is rendering video. More particularly, a relatively low-resolution rendering of video may use a relatively small portion of the compute elements within the array 214, whereas a relatively high-resolution rendering of video may use a relatively large portion (e.g., all) of the compute elements. Different amounts of compute elements operating at any given point in time may correspond to different activities engaged in by the graphics engine 112 and, thus, different states of the device 102.

Returning to FIG. 1, the example display 114 displays content to a user. In some examples, the content displayed via the display 114 may correspond to data processed by the data processing hardware platform 112. For instance, the display 114 may display a video rendered by the graphics engine 112 of FIG. 2.

In the illustrated example of FIG. 1, the example AI engine 116 serves to determine the current context of the device 102 and to control or adjust the operation of the components of the device 102 to adapt their use to the current context of the device. As mentioned above, the current "context" of a device refers to the current operations, functions, intended purposes, workloads, environmental conditions, and/or any other factors that may be used by the AI engine 116 to manage and/or control the operation of the components of the device 102 to achieve increased power efficiency, increased performance speeds, increased memory response times, and/or any other target metric(s) while still operating properly under the conditions and/or limitations imposed by the current context of the device 102. The particular efficiencies achieved by the implementation of the AI engine 116 may depend on the intended use of the device (a particular factor in determining the current context of the device) in relationship to other factors used to determine the current context of the device. Further detail regarding the implementation of the AI engine 116 is provided below in connection with FIG. 3.

While an example manner of implementing the variable-state computing device 102 is illustrated in FIG. 1, one or more of the elements, processes and/or devices illustrated in FIG. 1 may be combined, divided, re-arranged, omitted, eliminated and/or implemented in any other way. Further, the example communications interface 106, the example memory 108, the example user input interface 110, the example data processing hardware platform 112, the example display 114, the example AI engine 116, and/or, more generally, the example device 102 of FIG. 1 may be implemented by hardware, software, firmware and/or any combination of hardware, software and/or firmware. Thus, for example, any of the example communications interface 106, the example memory 108, the example user input interface 110, the example data processing hardware platform 112, the example display 114, the example AI engine 116, and/or, more generally, the example device 102 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example communications interface 106, the example memory 108, the example user input interface 110, the example data processing hardware platform 112, the example display 114, and/or the example AI engine 116 is/are hereby expressly defined to include a non-transitory computer readable storage device or storage disk such as a memory, a digital versatile disk (DVD), a compact disk (CD), a Blu-ray disk, etc. including the software and/or firmware. Further still, the example device 102 may include one or more elements, processes and/or devices in addition to, or instead of, those illustrated in FIG. 1, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 3:
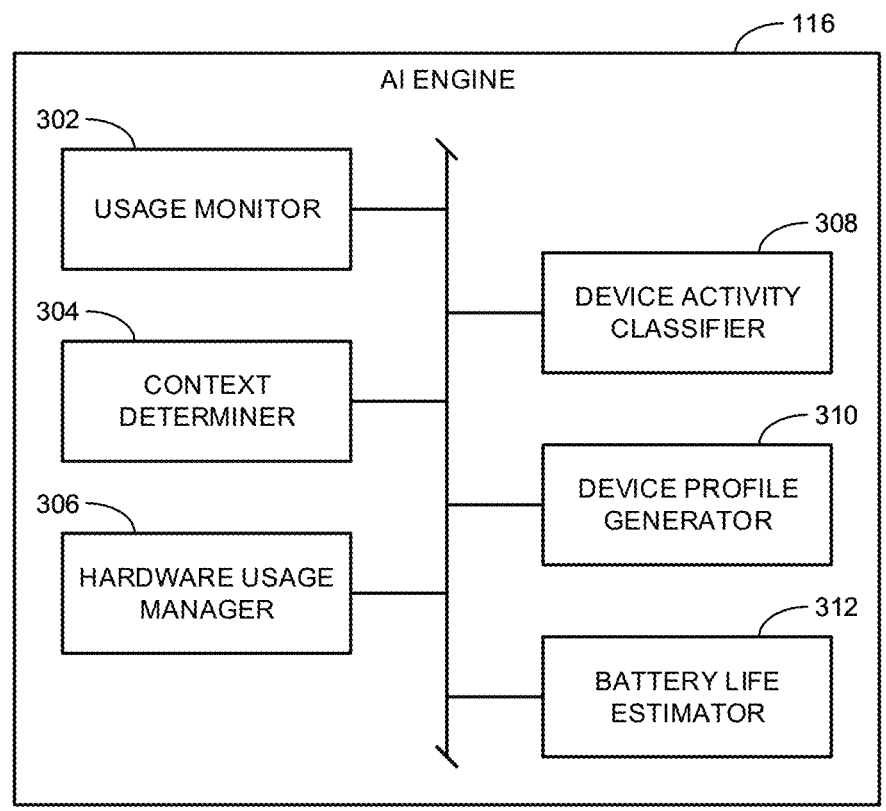
FIG. 3 is a block diagram illustrating an example implementation of the example AI engine of FIG. 1.

FIG. 3 is a block diagram illustrating an example implementation of the example AI engine 116 of FIG. 1. In the example of FIG. 3, the AI engine 116 includes an example usage monitor 302, an example context determiner 304, an example hardware usage manager 306, an example device activity classifier 308, an example device profile generator 310, and an example battery life estimator 312.

The example AI engine 116 of FIG. 3 includes the example usage monitor 302 to monitor the usage and/or operation of components of the device 102 to determine and/or track how the components are being used at any given point in time. Data indicative of the usage and/or operation of any set, subset, or all of the components of the device 102 is referred to herein as usage data. Usage data may correspond to data received by the communications interface 106 of FIG. 1 and/or data generated by the communications interface 106 based on the received data. Similarly, usage data may include data provided by a user via the user input interface 110 of FIG. 1 and/or data generated by the user input interface based on the user input data. Further, usage data may include data being processed by the hardware platform 112 of FIG. 1 and/or data generated by the hardware platform 112. In some examples, the usage data may include data indicative of the use, operation, and/or workload of individual sub-components of the blocks shown in FIG. 1. Thus, for example, where the data processing hardware platform 112 is implemented by the graphics engine 112 of FIG. 2, the usage data may include an indication of which individual compute elements (and/or how many) are operating at any given point in time. In some examples, the usage data monitored by the usage monitor 302 indicates not only what hardware is being used at any given time, but also how the hardware is being used. That is, the usage data may include specific operational parameters associated with the hardware components indicating whether the components are powered, the particular power states for the components (e.g., when there are states in addition to on and off states), voltage levels, power gating parameters, clock rates, frequency, functional capacities, etc. In some examples, the usage monitor 302 may access the software stack of the device 102 to associate the activity and/or operation of the hardware in the device 102 with corresponding software running on the device 102.

The example context determiner 304 of FIG. 3 determines a current context for the device 102. As mentioned above, the current context of a device refers to the current operations, functions, intended purposes, workloads, environmental conditions, and/or any other factors determined based on any relevant inputs available to the AI engine 116. In some examples, the relevant inputs include the usage data as monitored by the usage monitor 302. Additionally or alternatively, in some examples, the relevant inputs used by the context determiner 304 include sensor data from the sensor 104 of FIG. 1 indicating the conditions and/or characteristics of the environment surrounding the device 102.

As the context determiner 304 analyzes usage data and/or sensor data over time, the context determiner 304 learns to distinguish one context from another. In some examples, this learning is represented in a context learning model generated and updated by the context determiner 304 over time. By updating the context learning model over time, the context determiner 304 can improve its ability to accurately infer or identify particular contexts for the device even if the contexts have not been experienced before.

In the illustrated example of FIG. 3, the hardware usage manager 306 adjusts or controls the operation of the components of the device 102 based on the current context of the device, which may be based on the intended purpose for which a user is using the device, the workload and associated primary data being processed by the device, relevant characteristics of the surrounding environment of the device, particular preferences of target metrics to be improved (e.g., optimized), and so forth. As a specific example, assume the system 100 of FIG. 1 corresponds to a video surveillance system. In some examples, a goal of operating the AI engine may be to conserve power. That is, one of the target metrics may be power efficiency. In such examples, the hardware usage manager 306 may determine the level of resolution for the video to be rendered based on the context of the device and then adjust the operation of the graphics engine 112 of FIG. 2 to implement no more compute elements than necessary to achieve the appropriate level of resolution.

The particular way in which the hardware usage manager 306 adjusts operation of the graphics engine 112 to improve power efficiency may further depend on other aspects of the context in which the device 102 is to provide the rendered video. For example, the particular purpose of the surveillance system may be to detect and/or identify one or more target characteristic(s). The particular type or nature of target characteristic(s) may correspond to different contexts for the device. For examples, the target characteristic to be identified in the video feed may be the presence of a person within the field of view of the camera (e.g., the sensor 104). In this context, the resolution of the video rendering needs to be sufficient to enable the identification of a person. By contrast, if the context is such that target characteristic for the video feed corresponds to any detected movement in the field of view of the camera, a lower resolution than in the above scenario may be sufficient. If the target characteristic for the video feed is to distinguish between authorized personnel in the relevant area from unauthorized intruders, a higher resolution video sufficient to adequately represent facial and/or other identifying features of the people may be necessary. Thus, the intended purpose of the video and/or relevant target characteristic(s) to be identified (as a factor in the context determination) can impact the sort of hardware requirements for the graphics engine 112. However, if the context determiner 304 determines that the display 114 of the device 102 is a low-quality screen that cannot represent high resolution video, the hardware usage manager 306 may reduce the resolution of the video rendered by the graphics engine 112 to be no more than what matches the context of the low-resolution display 114.

More complex controls of the system are also possible. For example, the context determiner 304 may detect a person within a particular portion of the scene captured by a camera with no activity being detected in other portions of the scene. Under such a context, the hardware usage manager 306 may cause the graphics engine 112 to render the region of the video data associated with the person with a relatively high resolution (because that is the region of interest, relevance, or importance to a user of the system) while the rest of the video data is rendered with a relatively low resolution. While the above examples involve the hardware usage manager 306 adjusting the operation of the graphics engine/hardware platform 112), the hardware usage manager 306 may also adjust the operation of other components of the device 102. For example, the hardware usage manager 306 may cause the camera (e.g., the sensor 104) to focus on and/or zoom in on a particular region of interest (e.g., a detected person) in the scene captured by the camera to further enhance the high-resolution portion of the video rendered by the graphics engine 112.

The above examples enable the rendering of a video feed at sufficient resolutions to serve the intended purpose of the device 102 without invoking any unnecessary processing of the video stream, thereby reducing the processing capacity and, thus, the power consumption of the system 100. In other examples, the goal of operating the AI engine 116 may be to improve the efficiency of some target metric other than power conservation. For instance, in other examples not necessarily related to video surveillance, the hardware usage manager 306 may adapt the operation of the components of the device 102 to improve (e.g., optimize) the performance or computational efficiency of the device 102. As a specific example, when the current context of the device 102 as determined by the context determiner 304 indicates a CPU is handling a heavy workload, the hardware usage manager 306 may cause some of the workload to be handled by the graphics engine 112 to maintain high speed performance of the system as a whole. In other examples, the hardware usage manager 306 may tailor operational parameters of the components of the device to improve (e.g., optimize) the memory response time of the device 102. As a specific example, the hardware usage manager 306 may control which data is stored in a local cache of a processor and which data is stored in a memory external to the processor (e.g., may control data caching). In other examples, the hardware usage manager 306 may adjust operational parameters to strike a suitable balance between multiple different target metrics (e.g., memory speed, computation efficiency, power efficiency, etc.).

As the hardware usage manager 306 adjusts the operational parameters of device hardware in light of different contexts, additional feedback (e.g., additional usage data) may indicate whether the adjustments are adequately meeting the desired operations and efficiencies for the device. If not, the hardware usage manager 306 may further tune the operational parameters. In this manner, the hardware usage manager 306 learns suitable operational parameters for the device hardware under the particular circumstances. In some examples, this learning is represented in an operational learning model generated and updated by the hardware usage manager 306 over time. By updating (e.g., constantly updating) the operational learning model over time, the hardware usage manager 306 can improve in its ability to quickly identify suitable operational parameters for the device hardware that achieve desired functions with increased (e.g., optimized) efficiency, even when the particular context of the device may not have been experienced before.

In the example of FIG. 3, the device activity classifier 308 identifies and classifies different device activities or combinations of device activities based on an analysis of the usage data monitored by the usage monitor 302 in a similar manner to the operations of the context determiner 304 described above. In some examples, the context determiner 304 and the device activity classifier 308 are integrated to operate as a unit. As mentioned above, a device activity refers to any operation or function performed by one or more hardware components of the device 102. In some examples, different device activities may also be classified based on the software application(s) that are executed to perform the corresponding operations of the underlying hardware.

Figure 4:
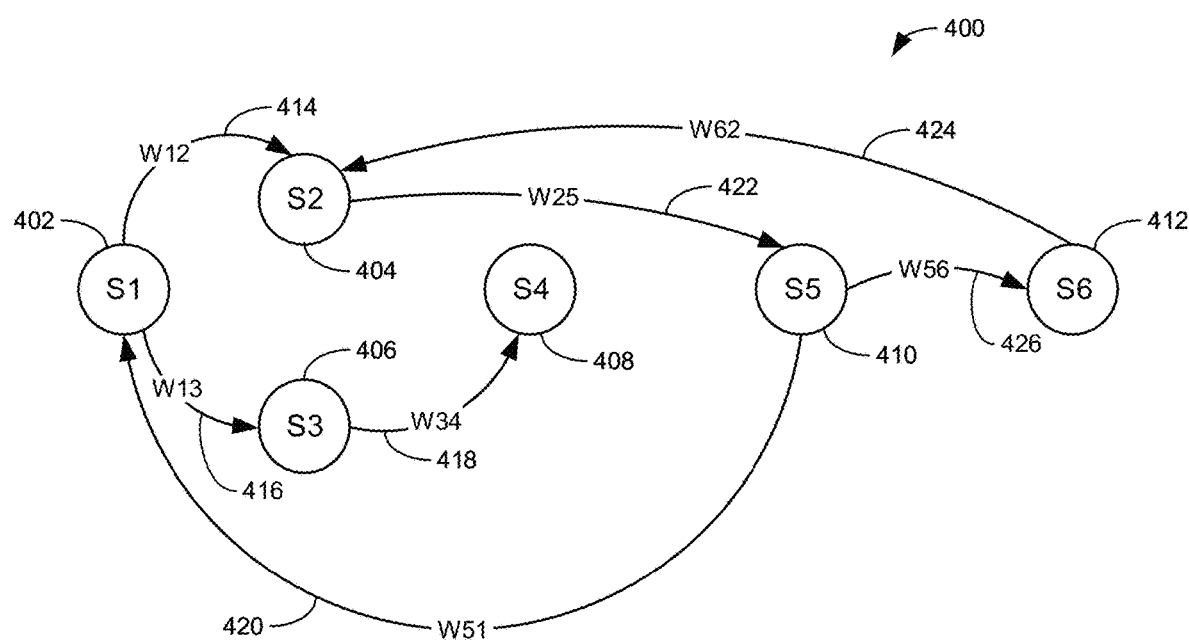
FIG. 4 illustrates an example device profile representative of different states of the device of FIG. 1 and corresponding transitions between the different states.

Many users repeat tasks with their computing devices such that there are likely to be a relatively limited number of different activities or combination of activities that account for the vast majority of the operations of a device. Furthermore, users do not typically jump from one task to another in an arbitrary or random manner, but instead follow patterns arising from the nature of the device and/or how the users use the device. Based on these assumptions, in some examples, the device profile generator 310 of FIG. 3 combines the different device activities identified by the device activity classifier 308 to generate a profile or signature for the device 102. A device profile may be represented as a state diagram that indicates the different expected states of the device as well as the probabilities of transitions between different ones of the states. An example device profile 400 is illustrated in FIG. 4 that includes six states 402, 404, 406, 408, 410, 412 interconnected by seven edges or transitions 414, 416, 418, 420, 422, 424, 426. In some examples, the different states are identified based on individual device activities and/or particular combinations of activities classified by the device activity classifier 308. Thus, in some examples, the device profile generator 310 maps one or more particular activities identified by the device activity classifier 308 to one or more particular states 402, 404, 406, 408, 410, 412. Further, the device profile generator 310 may track the transitions 414, 416, 418, 420, 422, 424, 426 between different ones of the states over time. After monitoring the changes from one state to another in this manner, the device profile generator 310 may assign different weights to different ones of the transitions 414, 416, 418, 420, 422, 424, 426 to indicate a probability of the device transitioning from any particular state to any other state. In some examples, the transition probabilities may depend on the duration that a device remains within a particular state. Accordingly, in some examples, the device profile generator 310 monitors the duration that the device 102 continues operating within a particular state and assigns the transition probabilities based on the timing information.

The different operational states and the corresponding transition probabilities for a given device may depend upon the type of device and/or the intended use of the device. For example, the different operational states commonly implemented on a smartphone may include browsing the Internet, using a global positioning system to determine directions to a location, taking a picture or video, sending a text message, making a phone call, etc. By contrast, common operational states of a desktop computer used in a business may include opening and reviewing documents, word processing, sending email, etc. Further, the states most often employed for smartphone devices and desktop business computers are likely to be different than the states most often employed for a device operating as a server in a private cloud for a national bank or a server for an online retailer.

While the device profile 400 for any particular device is likely to be unique, in some examples, the device profile generator 310 is trained using a learning data set before the device 102 is distributed to an end user (e.g., at the time of manufacture and/or prior to assembly) based on frequently performed operations of the device expected by end users of the particular type of device in which the AI engine 116 is implemented. This initial training of the device profile generator 310 provides a starting point for the device profile 400 that may be refined over time as the device profile generator 310 learns the particular states of the device and associated transitions based on the particular use of the device by a particular end user. In other examples, the device profile generator 310 may begin with a blank slate in developing the device profile 400 once the device 102 is put into use by an end user.

In some examples, the device profile 400 generated by the device profile generator 310 is used as an additional input for the context determiner 304 to further facilitate the hardware usage manager 306 in managing the operation and/or usage of components within the device 102. For example, any particular state represented in the device profile 400 corresponds to one or more particular device activities identified by the device activity classifier 308. States serve as relevant inputs in defining the current context of the device. As such, the hardware usage manager 306 may determine suitable operational parameters for the device hardware to improve (e.g., optimize) the efficiency of the device when operating in the context of any one of the identified states. However, the device profile 400, determining the current context of the device 102 is not limited to a snapshot of the present circumstances of the device, but may additionally or alternatively be informed by future predicted states of the device. In particular, as mentioned above, the transitions represented in the device profile 400 are assigned weights respectively indicative of probabilities of a device in a particular state transitioning to different states. In some examples, when the probability of a transition from a current state to some other state exceeds a threshold, the hardware usage manager 306 may adapt the operational parameters of the device hardware in anticipation of the device transitioning to another state.

As a specific example, assume the device profile 400 for the device 102 indicates a very high probability that after a user reviews emails (a first device state), the user will transition to playing a video game (a second device state). In some such examples, when the context determiner 304 determines that the current context of the device includes the user reviewing emails, the context determiner 304 may also determine from the device profile 400 that there is a high likelihood that the user will soon begin playing a video game. Based on this current context, the hardware usage manager 306 may activate the graphics engine 112 in anticipation of the need to render high quality images for the video game to provide a smooth experience for the end user. As mentioned above, in some examples, the transition probabilities in the device profile 400 may be based on a duration that the device is operating within a particular state (e.g., in-state dwell time). Accordingly, if the device profile 400 indicates that the user usually spends 15 minutes reviewing emails before transitioning to play video games, the hardware usage manager 306 may not activate the graphics engine 112 until the device has been in the current state (associated with reviewing emails) for 15 minutes. Thus, by generating a device profile 400 as disclosed herein, the AI engine 116 is able to anticipate changes in hardware requirements based on the operational parameters defined for both a current state and future predicted state(s) of the device 102 to further improve (e.g., optimize) the efficiency of the device as it changes from one state to another.

In the illustrated example of FIG. 3, the AI engine 116 is provided with the battery life estimator 312 to estimate a battery life of the device 102. In some examples, the example battery life estimator 312 predicts the remaining battery life of the device 102 based on the device profile 400 (generated by the device profile generator 310) and the operational parameters affecting power consumption (determined and/or controlled by the hardware usage manager 306) for different states and/or contexts of the device 102 (determined by the context determiner 304 and/or the device activity classifier 308). That is, the battery life estimator 312 is able to determine current power consumption based on the current state and/or context of the device 102. The battery life estimator 312 is also able to determine the power consumption that is anticipated in the future based on future states of the device predicted based on transition probabilities in the device profile 400. In this manner, the battery life estimator 312 is able to predict the battery life for the device 102 more accurately than existing approaches.

While an example manner of implementing the AI engine 116 of FIG. 1 is illustrated in FIG. 3, one or more of the elements, processes and/or devices illustrated in FIG. 3 may be combined, divided, re-arranged, omitted, eliminated and/or implemented in any other way. Further, the example usage monitor 302, the example context determiner 304, the example hardware usage manager 306, the example device activity classifier 308, the example device profile generator 310, the example battery life estimator 312, and/or, more generally, the example AI engine 116 of FIG. 1 may be implemented by hardware, software, firmware and/or any combination of hardware, software and/or firmware. Thus, for example, any of the example usage monitor 302, the example context determiner 304, the example hardware usage manager 306, the example device activity classifier 308, the example device profile generator 310, the example battery life estimator 312, and/or, more generally, the example AI engine 116 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example usage monitor 302, the example context determiner 304, the example hardware usage manager 306, the example device activity classifier 308, the example device profile generator 310, and/or the example battery life estimator 312 is/are hereby expressly defined to include a non-transitory computer readable storage device or storage disk such as a memory, a digital versatile disk (DVD), a compact disk (CD), a Blu-ray disk, etc. including the software and/or firmware. Further still, the example AI engine 116 of FIG. 1 may include one or more elements, processes and/or devices in addition to, or instead of, those illustrated in FIG. 3, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Flowcharts representative of example hardware logic, machine readable instructions, hardware implemented state machines, and/or any combination thereof for implementing the device 102 of FIG. 1 and/or the associated AI engine 116 of FIGS. 1 and/or 3 are shown in FIGS. 5-9. The machine readable instructions may be an executable program or portion of an executable program for execution by a computer processor such as the processor 1012 shown in the example processor platform 1000 discussed below in connection with FIG. 10. The program may be embodied in software stored on a non-transitory computer readable storage medium such as a CD-ROM, a floppy disk, a hard drive, a DVD, a Blu-ray disk, or a memory associated with the processor 1012, but the entire program and/or parts thereof could alternatively be executed by a device other than the processor 1012 and/or embodied in firmware or dedicated hardware. Further, although the example program is described with reference to the flowcharts illustrated in FIG. 5-9, many other methods of implementing the example device 102 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 5-9 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

Figure 5:
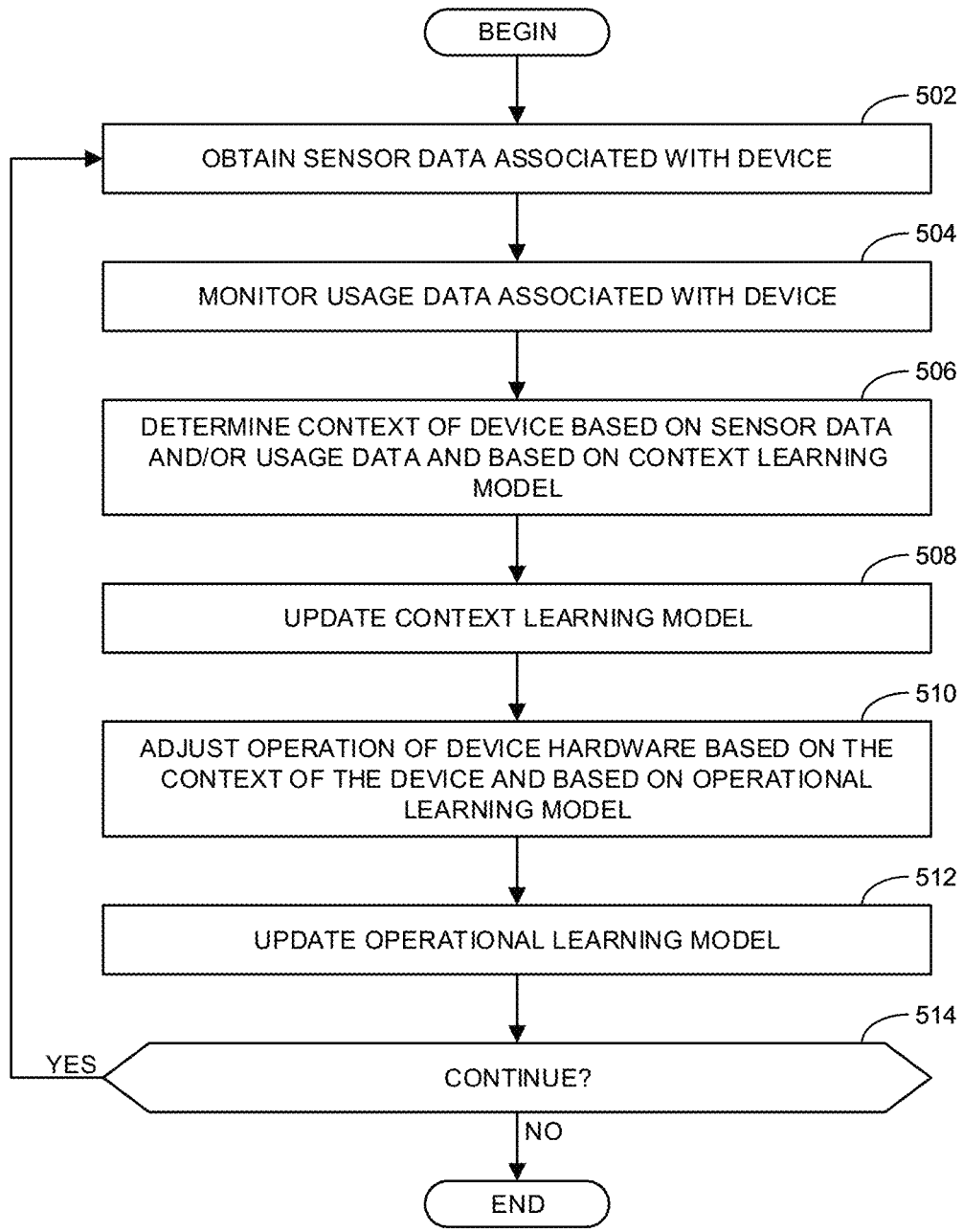
FIGS. 5-9 are flowcharts representative of example machine readable instructions that may be executed to implement the example device of FIG. 1 and/or the AI engine of FIGS. 1 and/or 3.

The program of FIG. 5 begins at block 502 with the example communications interface 106 obtaining sensor data (e.g., from the sensor 104) associated with the device 102. At block 504, the example usage monitor 302 monitors usage data associated with the device 102. At block 506, the example context determiner 304 determines a context of the device 102 based on the sensor data and/or the usage data and based on a context learning model. At block 508, the example context determiner 304 updates the context learning model. At block 510, the example hardware usage manager 306 adjusts the operation of the device hardware (e.g., the data processing hardware platform 112 among other components) based on the context of the device 102 and based on an operational learning model. At block 512, the example hardware usage manager 306 updates the operational learning model. At block 514, the example process of FIG. 5 determines whether to continue. If so, control returns to block 502. Otherwise, the example process of FIG. 5 ends.

Figure 6:
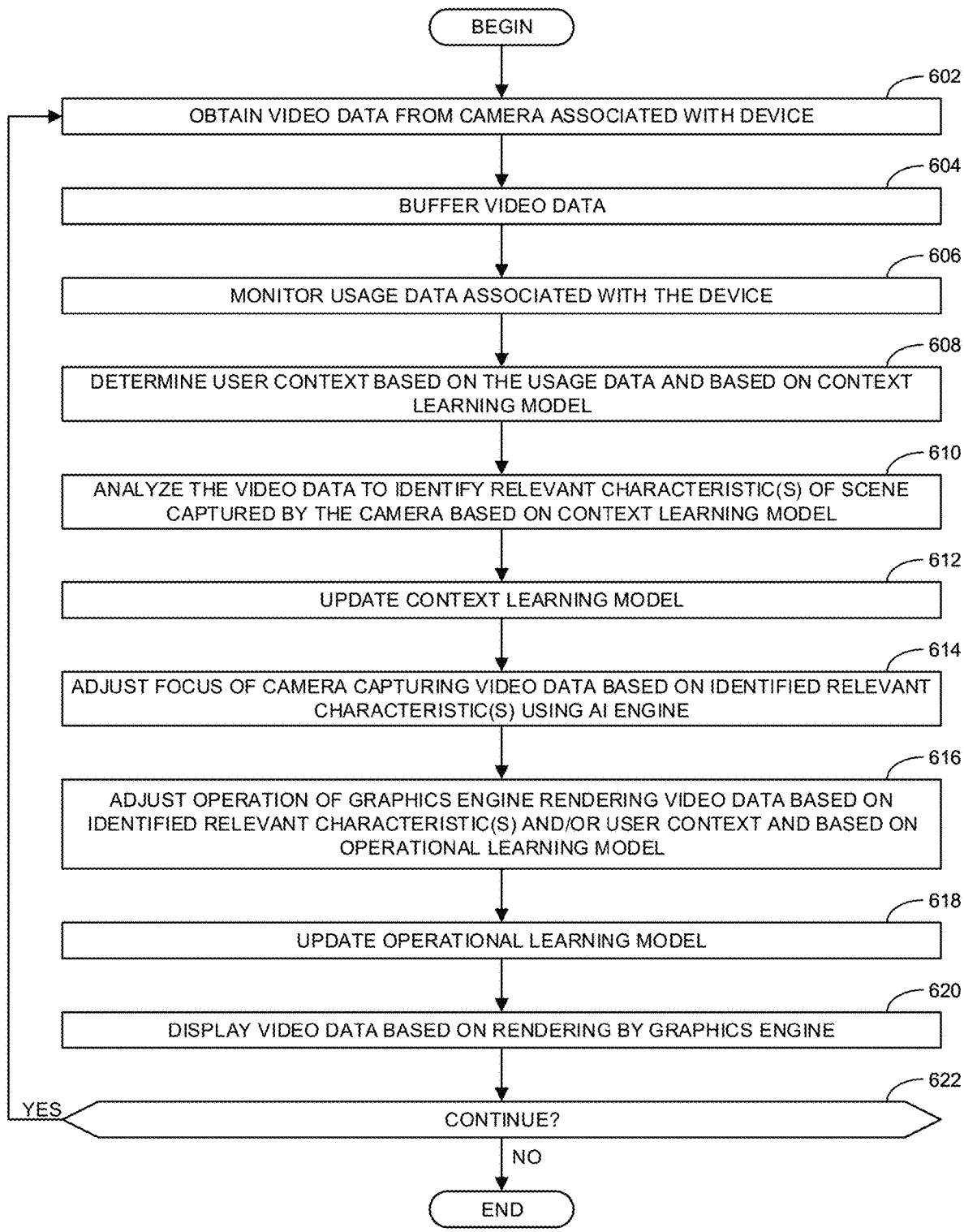

FIG. 6 is a flowchart illustrating example instructions to implement the device 102 of FIG. 1 implemented in the context of a video surveillance system. The program of FIG. 6 begins at block 602 with the example communications interface 106 obtaining video data from a camera (e.g., the sensor 104) associated with the device 102. At block 604, the example memory 108 buffers the video data. At block 606, the example usage monitor 302 monitors usage data associated with the device 102. At block 608, the example context determiner 304 determines a user context based on the usage data and based on a context learning model. In this example, the user context may include preferences of a user of the device 102 and/or environmental factors surrounding the device 102 (e.g., lighting conditions of the surrounding environment, etc.). At block 610, the example context determiner 304 analyzes the video data to identify relevant characteristic(s) of the scene captured by the camera based on the context learning model. Blocks 608 and 610 of FIG. 6 both correspond to different aspects of determining the context of the device 102 as expressed in block 506 of FIG. 5.

At block 612, the example context determiner 304 updates the context learning model. At block 614, the example hardware usage manager 306 adjusts focus of the camera capturing the video data based on the identified relevant characteristic(s). At block 616, the example hardware usage manager 306 adjusts the operation of the graphics engine 112 of FIG. 2 (corresponding to the data processing hardware platform 112 of FIG. 1) rendering the video data based on the identified characteristic(s) and/or user context and based on operational learning model. At block 618, the example hardware usage manager 306 updates the operational learning model. At block 620, the example display 114 displays the video data based on the rendering by the graphics engine 112. At block 622, the example device 102 determines whether to continue the process. If so, control returns to block 602. Otherwise, the example process of FIG. 6 ends.

Figure 7:
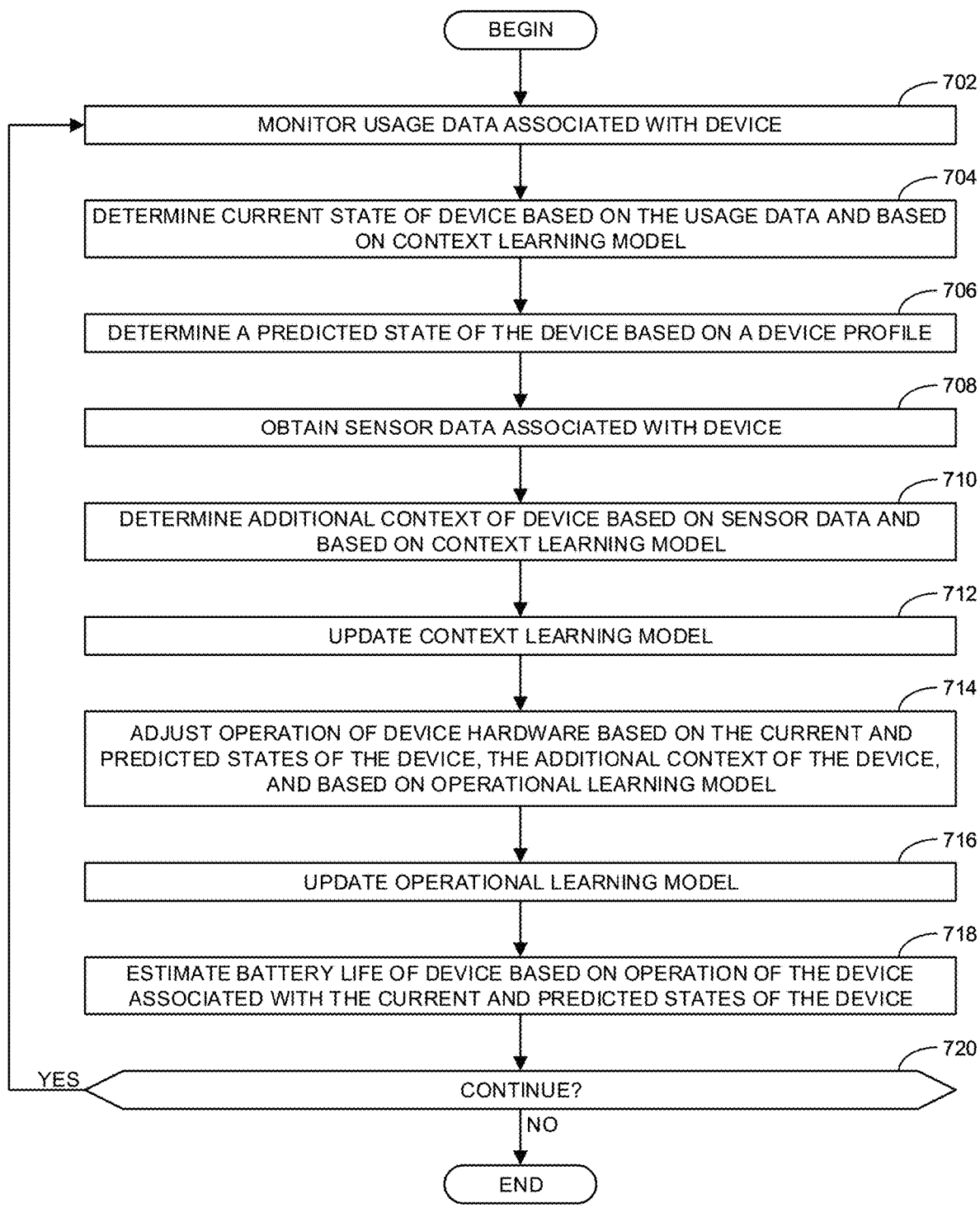

FIG. 7 is a flowchart illustrating example instructions that use a device profile to implement the device 102 of FIG. 1. The program of FIG. 7 begins at block 702 with the example usage monitor 302 monitoring usage data associated with the device 102. At block 704, the example device activity classifier 308 determines the current state of the device 102 based on the usage data and based on a context learning model. As described above, the current state of the device 102 corresponds to an aspect of the context of the device. Accordingly, in some examples, block 704 may be implemented by the context determiner 304 instead of the device activity classifier 308. At block 706, the example context determiner 304 determines a predicted state of the device 102 based on a device profile (e.g., the device profile 400 of FIG. 4). Both the current state (determined at block 704) and the predicted state (determined at block 706) correspond to aspects of determining the context of the device 102 as expressed in block 506 of FIG. 5. FIG. 7 provides further detail regarding the generation of the device profile 400. At block 708, the communications interface 106 obtains sensor data associated with the device 102. At block 710, the example context determiner 304 determines additional context of the device 102 based on the sensor data. At block 712, the example context determiner 304 updates the context learning model.

At block 714, the example hardware usage manager 306 adjusts the operation of the device hardware (e.g., the data processing hardware platform 112 among other components) based on the current and predicted states of the device 102, the additional context of the device 102, and based on an operational learning model. At block 716, the example hardware usage manager 306 updates the operational learning model. At block 718, the example battery life estimator 312 estimates a batter life of the device 102 based on the operation of the device hardware associated with the current and predicted states of the device 102. At block 720, the example process of FIG. 7 determines whether to continue. If so, control returns to block 702. Otherwise, the example process of FIG. 7 ends.

Figure 8:
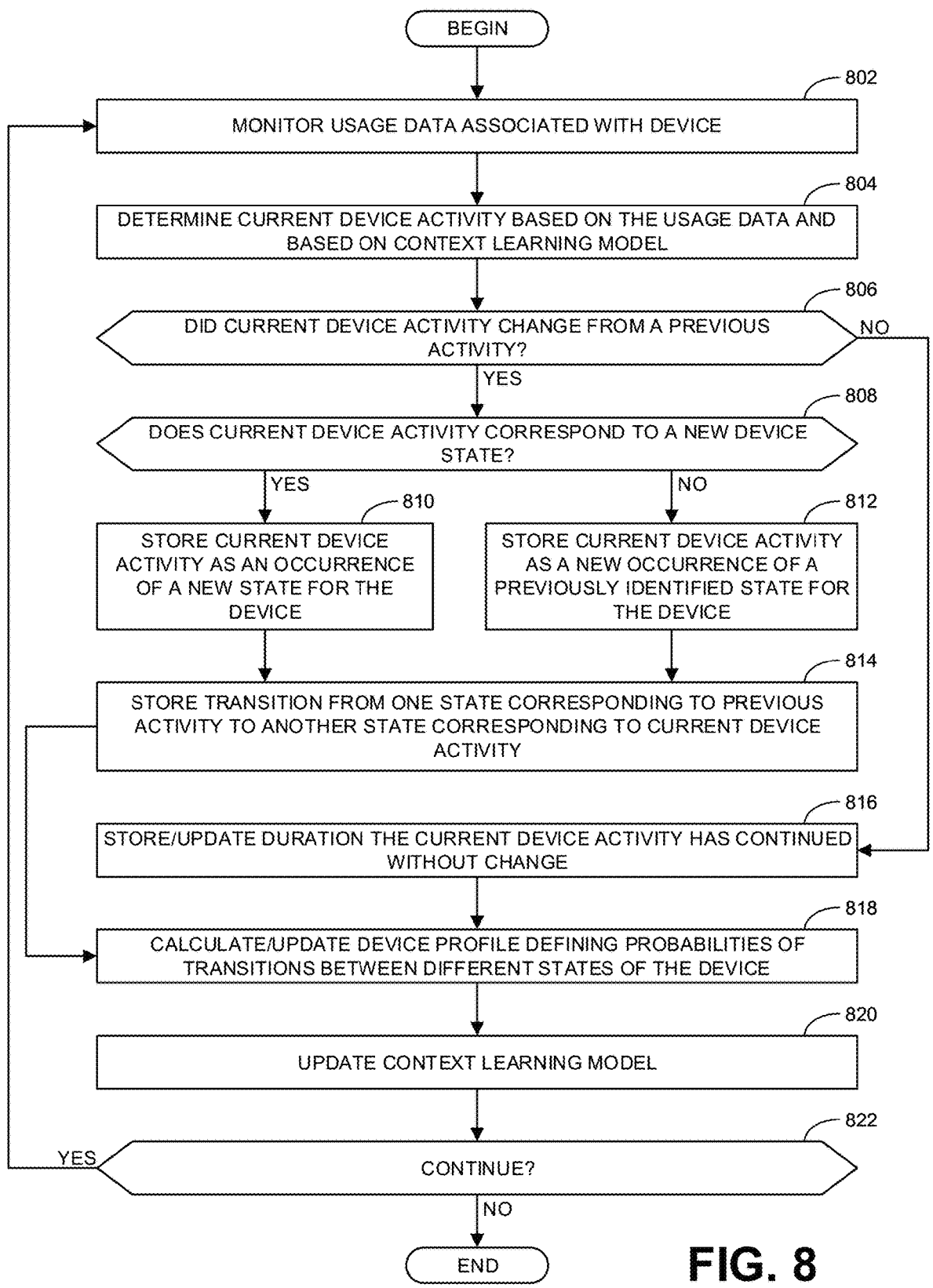

FIG. 8 is a flowchart illustrating example instructions to implement the AI engine 116 of FIG. 3 to generate a device profile for the device 102 of FIG. 1. The program of FIG. 8 begins at block 802 where the usage monitor 302 monitors usage data associated with the device 102. At block 804, the example device activity classifier 308 determines a current device activity based on the usage data and based on a context learning model. At block 806, the example device activity classifier 308 determines whether the current device activity changed from a previous activity. That is, the device activity classifier 308 determines whether the current device activity is a newly detected activity. If so, control advances to block 808 where the example device profile generator 310 determines whether the current device activity corresponds to a new device state. If so, control advances to block 810 where the example device profile generator 310 stores the current device activity as an occurrence of a new state for the device 102. If the current device activity does not correspond to a new device state (block 808), the example device profile generator 310 stores the current device activity as a new occurrence of a previously identified state for the device 102. After either block 810 or block 812, control advances to block 814 where the example device profile generator stores a transition from one state corresponding to the previous activity to another state corresponding to the current device activity. Thereafter, control advances to block 818 discussed below.

Returning to block 806, if the example device activity classifier 308 determines that the current device activity has not changed from the previous activity, control advances to block 816. At block 816, the example device profile generator 310 stores and/or updates the duration the current device activity has continued without changing. At block 818, the example device profile generator 310 calculates and/or updates a device profile (e.g., the device profile 400 of FIG. 4) defining probabilities of the transitions between the different states of the device 102. At block 820, the example context determiner 822 updates the context learning model. Thereafter, the example AI engine 116 determines whether to continue. If so, control returns to block 802. Otherwise, the example process of FIG. 8 ends.

Figure 9:
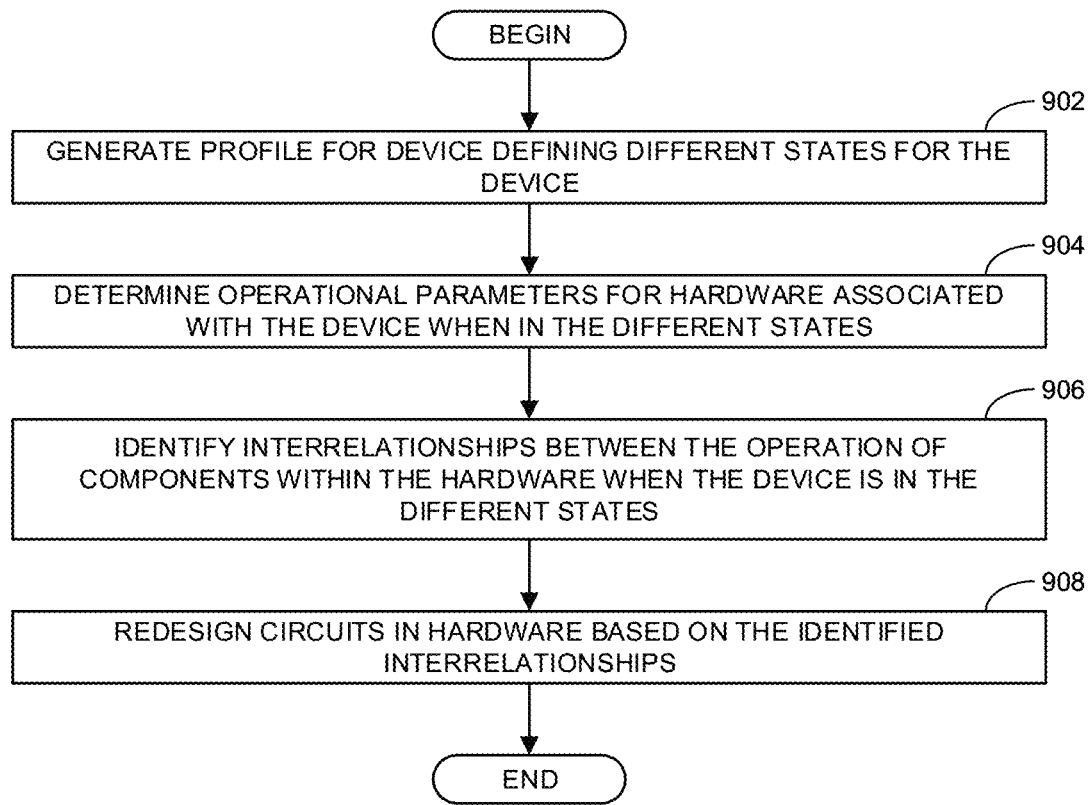

FIG. 9 is a flowchart representative of an example method to implement the device 102 to facilitate the design of new devices. The example process of FIG. 9 begins at block 902 where the example AI engine 116 generates a device profile (e.g., the device profile 400 of FIG. 4) defining different states for the device 102. An example implementation of block 902 is provided above in connection with FIG. 8. At block 904, the example hardware usage manager 306 determines operational parameters for hardware associated with the device when in the different states.

At block 906, the example hardware usage manager 306 identifies interrelationships between the operation of components within the hardware when the device 102 is in the different states. In some examples, block 906 may accomplished by a design engineer and/or other individual using a different device after collecting and analyzing the device profile and operational parameters generated at blocks 902 and 904. As a specific example, if the device profile 400 indicates that a first hardware component associated with a particular device activity engaged in during one or more states is activated in conjunction with a second hardware component that is not used during the one or more states, a design engineer may redesign the hardware circuits so that the two hardware components may be separately powered or activated. In this manner, the AI engine in the newly designed device may separately control the operation of the two components so that only the first component is activated during the relevant device states to reduce power consumption.

Returning to the flowchart of FIG. 9, at block 908, the design engineer and/or other individual redesigns circuits in the hardware based on the identified interrelationships. Thereafter, the example process of FIG. 9 ends.

Figure 10:
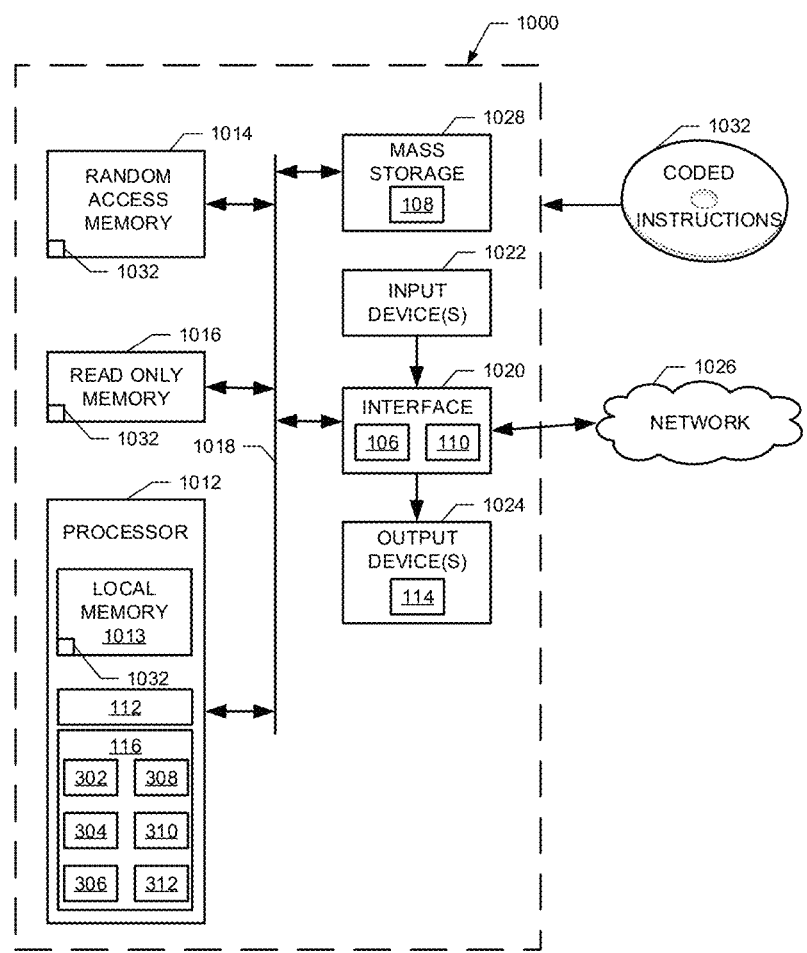
FIG. 10 is a block diagram of an example processing platform structured to execute the instructions of FIG. 5-9 to implement the example variable-state computing device of FIGS. 1 and/or 2 and/or the AI engine of FIGS. 1 and/or 3.

FIG. 10 is a block diagram of an example processor platform 1000 structured to execute the instructions of FIGS. 5-9 to implement the device 102 of FIGS. 1 and/or 2 and/or the associated AI engine 116 of FIGS. 1 and/or 3. The processor platform 1000 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 1000 of the illustrated example includes a processor 1012. The processor 1012 of the illustrated example is hardware. For example, the processor 1012 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example data processing hardware platform 112 and the example AI engine 116 (including the example usage monitor 302, the example context determiner 304, the example hardware usage manager 306, the example device activity classifier 308, the example device profile generator 310, and the example battery life estimator 312).

The processor 1012 of the illustrated example includes a local memory 1013 (e.g., a cache). The processor 1012 of the illustrated example is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1016 may be implemented by flash memory and/or any other desired type of memory device. Access to the main memory 1014, 1016 is controlled by a memory controller.

The processor platform 1000 of the illustrated example also includes an interface circuit 1020. The interface circuit 1020 may be implemented by any type of interface standard, such as an Ethernet interface, a universal serial bus (USB), a Bluetooth® interface, a near field communication (NFC) interface, and/or a PCI express interface. In this example, the interface 1020 implements the example communications interface 106 and the example user input interface 110 of FIG. 1.

In the illustrated example, one or more input devices 1022 are connected to the interface circuit 1020. The input device(s) 1022 permit(s) a user to enter data and/or commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1024 (e.g., the display 114 of FIG. 1) are also connected to the interface circuit 1020 of the illustrated example. The output devices 1024 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1020 of the illustrated example, thus, typically includes a graphics driver card, a graphics driver chip and/or a graphics driver processor.

The interface circuit 1020 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1026. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1000 of the illustrated example also includes one or more mass storage devices 1028 for storing software and/or data. Examples of such mass storage devices 1028 include floppy disk drives, hard drive disks, compact disk drives, Blu-ray disk drives, redundant array of independent disks (RAID) systems, and digital versatile disk (DVD) drives.

The machine executable instructions 1032 of FIGS. 5-9 may be stored in the mass storage device 1028, in the volatile memory 1014, in the non-volatile memory 1016, and/or on a removable non-transitory computer readable storage medium such as a CD or DVD.

From the foregoing, it will be appreciated that example methods, apparatus and articles of manufacture have been disclosed that enable the identification of a context of a device based on available information. The context of the device is then used to adjust or control the operational parameters associated with hardware of the device to achieve increased power efficiency, increased performance speeds, increased memory response times, and/or any other target metric(s) while still operating the device properly under the conditions and/or limitations imposed by the current context of the device. Further, these outcomes are accomplished using an AI engine that learns how to determine the context and manage hardware usage over time, thereby improving (e.g., optimizing) the outcome the more the AI engine is used. In some examples, the AI engine also learns the different states of the devices and the probabilities of transitioning between such states to define a device profile that may be used to predict future states of the device. By identifying or predicting future states of the device, changes in hardware requirements may be anticipated to further improve efficient operation of the device. Thus, the disclosed methods, apparatus and articles of manufacture are accordingly directed to one or more improvement(s) in the functioning of a computer.

Example 1 includes a computing device comprising a hardware platform, and an artificial intelligence (AI) engine to determine a context of the device, and adjust an operation of the hardware platform based on an expected change in the context of the device, the adjustment to modify at least one of a computational efficiency of the device, a power efficiency of the device, or a memory response time of the device.

Example 2 includes the computing device as defined in example 1, further including a communications interface to receive sensor data from a sensor, the sensor data to be processed by the hardware platform, and a usage monitor to monitor usage data associated with the device, the usage data indicative of usage of components associated with the device.

Example 3 includes the computing device as defined in example 2, further including the sensor, the sensor being a camera and the sensor data being video data, the context of the device based on content of the video data.

Example 4 includes the computing device as defined in example 3, wherein the context of the device is based on a lighting condition associated with an environment surrounding the device, the lighting condition defined by the sensor data.

Example 5 includes the computing device as defined in any one of examples 3 or 4, wherein the AI engine is to detect a target characteristic of the content of the video data, the target characteristic defined by the usage data, and determine the context of the device based on the detection of the target characteristic.

Example 6 includes the computing device as defined in example 5, wherein the target characteristic corresponds to a subject matter of the content of the video data.

Example 7 includes the computing device as defined in example 6, wherein the hardware platform is a graphics engine, and the AI engine is to adjust the operation of the hardware platform by causing the graphics engine to render a first portion of the video data with a first resolution and to render a second portion of the video data with a second resolution, the second resolution lower than the first resolution, the first portion of the video data associated with the target characteristic.

Example 8 includes the computing device as defined in example 7, wherein the AI engine is to adjust the operation of the hardware platform by adjusting a resolution of the video data rendered by the graphics engine.

Example 9 includes the computing device as defined in any one of examples 3-8, wherein the hardware platform is a graphics engine, and the AI engine is to adjust the operation of the hardware platform by adjusting a number of compute elements within the graphics engine used to render the video data.

Example 10 includes the computing device as defined in any one of examples 3-8, wherein the AI engine is to adjust the operation of the hardware platform to change a focus of the camera.

Example 11 includes the computing device as defined in any one of examples 1-11, wherein the AI engine is to adjust the operation of the hardware platform by adjusting an operational parameter associated with a component of the hardware platform, the operational parameter corresponding to at least one of a power state, a voltage level, a power gating, a clock rate, or a frequency.

Example 12 includes the computing device as defined in any one of examples 1-12, wherein the AI engine is to determine a current state of the device, determine a predicted state of the device based on the current state and a profile of the device, the profile defining different states of the device and probabilities of transitions between different ones of the different states, and determine the context of the device based on at least one of the current state of the device or the predicted state of the device.

Example 13 includes the computing device as defined in example 12, wherein the AI engine is to adjust the operation of the hardware platform based on the predicted state of the device.

Example 14 includes the computing device as defined in any one of examples 12 or 13, wherein the AI engine is to estimate a battery life of the device based on the current and predicted states of the device.

Example 15 includes the computing device as defined in any one of examples 12-14, wherein the AI engine is to generate the profile of the device by identifying different activities of the device, classifying the different activities to define the different states, identifying the transitions between the different ones of the different states, and calculating the probabilities of the transitions.

Example 16 includes the computing device as defined in example 15, wherein the different activities correspond to at least one of different operations of the hardware platform or different software applications being implemented on the hardware platform.

Example 17 includes the computing device as defined in any one of examples 15 or 16, wherein the AI engine is to monitor a duration of the different activities between different ones of the transitions, and calculate different probabilities for ones of the transitions based on the duration of the different activities.

Example 18 includes an artificial intelligence (AI) engine for a computing device, the AI engine comprising a context determiner to determine a context of the device, and a hardware usage manager to adjust an operation of a hardware platform of the device based on an expected change in the context of the device, the adjustment to modify at least one of a computational efficiency of the device, a power efficiency of the device, or a memory response time of the device.

Example 19 includes the AI engine as defined in example 18, further including a usage monitor to monitor usage data associated with the device, the usage data indicative of usage of components associated with the device, the context determiner to determine the context of the device based on the usage data and based on sensor data obtained from a sensor of the device, the sensor data to be processed by the hardware platform.

Example 20 includes the AI engine as defined in example 19, wherein the sensor is a camera and the sensor data is video data, the context of the device based on content of the video data.

Example 21 includes the AI engine as defined in example 20, wherein the context of the device is based on a lighting condition associated with an environment surrounding the device, the lighting condition defined by the sensor data.

Example 22 includes the AI engine as defined in any one of examples 20 or 21, wherein the context determiner is to detect a target characteristic of the content of the video data, the target characteristic defined by the usage data, and determine the context of the device based on the detection of the target characteristic.

Example 23 includes the AI engine as defined in example 22, wherein the target characteristic corresponds to a subject matter of the content of the video data.

Example 24 includes the AI engine as defined in example 23, wherein the hardware platform is a graphics engine, and the hardware usage manager is to adjust the operation of the hardware platform by causing the graphics engine to render a first portion of the video data with a first resolution and to render a second portion of the video data with a second resolution, the second resolution lower than the first resolution, the first portion of the video data associated with the target characteristic.

Example 25 includes the AI engine as defined in example 24, wherein the hardware usage manager is to adjust the operation of the hardware platform by adjusting a resolution of the video data rendered by the graphics engine.

Example 26 includes the AI engine as defined in any one of examples 20-25, wherein the hardware platform is a graphics engine, and the hardware usage manager is to adjust the operation of the hardware platform by adjusting a number of compute elements within the graphics engine used to render the video data.

Example 27 includes the AI engine as defined in any one of examples 20-26, wherein the hardware usage manager is to adjust the operation of the hardware platform to change a focus of the camera.

Example 28 includes the AI engine as defined in any one of examples 18-27, wherein the hardware usage manager is to adjust the operation of the hardware platform by adjusting an operational parameter associated with a component of the hardware platform, the operational parameter corresponding to at least one of a power state, a voltage level, a power gating, a clock rate, or a frequency.

Example 29 includes the AI engine as defined in any one of examples 18-27, wherein the context determiner is to determine a current state of the device, determine a predicted state of the device based on the current state and a profile of the device, the profile defining different states of the device and probabilities of transitions between different ones of the different states, and determine the context of the device based on at least one of the current state of the device or the predicted state of the device.

Example 30 includes the AI engine as defined in example 29, wherein the hardware usage manager is to adjust the operation of the hardware platform based on the predicted state of the device.

Example 31 includes the AI engine as defined in any one of examples 29 or 30, further including a battery life estimator to estimate a battery life of the device based on the current and predicted states of the device.

Example 32 includes the AI engine as defined in any one of examples 29-31, further including a device activity classifier to identifying different activities of the device, classifying the different activities to define the different states, and identifying the transitions between the different ones of the different states, and a device profile generator to calculating the probabilities of the transitions, and generate the profile of the device based on the different states, the transitions, and the probabilities.

Example 33 includes the AI engine as defined in example 32, wherein the different activities correspond to at least one of different operations of the hardware platform or different software applications being implemented on the hardware platform.

Example 34 includes the AI engine as defined in any one of examples 32 or 33, wherein the device profile generator is to monitor a duration of the different activities between different ones of the transitions, and calculate different probabilities for ones of the transitions based on the duration of the different activities.

Example 35 includes a non-transitory computer readable medium comprising instructions that, when executed, cause at least one processor to at least execute an artificial intelligence (AI) engine to determine a context of a device, and adjust an operation of the device based on an expected change in the context of the device, the adjustment to modify at least one of a computational efficiency of the device, a power efficiency of the device, or a memory response time of the device.

Example 36 includes the non-transitory computer readable medium as defined in example 35, wherein the instructions cause the at least one processor to determine the context based on sensor data collected from a sensor and usage data monitored by a usage monitor, the sensor data to be processed by the device, the usage data indicative of usage of components associated with the device Example 37 includes the non-transitory computer readable medium as defined in example 36, wherein the sensor is a camera and the sensor data is video data, the instructions to cause the at least one processor to determine the context of the device based on content of the video data.

Example 38 includes the non-transitory computer readable medium as defined in example 37, wherein the instructions further cause the at least one processor to determine the context of the device based on a lighting condition associated with an environment surrounding the device, the lighting condition defined by the sensor data.

Example 39 includes the non-transitory computer readable medium as defined in any one of examples 37 or 38, wherein the instructions further cause the at least one processor to detect, via the AI engine, a target characteristic of the content of the video data, the target characteristic defined by the usage data, and determine the context of the device based on the detection of the target characteristic.

Example 40 includes the non-transitory computer readable medium as defined in example 39, wherein the target characteristic corresponds to a subject matter of the content of the video data.

Example 41 includes the non-transitory computer readable medium as defined in example 40, wherein the instructions further cause the at least one processor to adjust the operation of the device by causing the device to render a first portion of the video data with a first resolution and to render a second portion of the video data with a second resolution, the second resolution lower than the first resolution, the first portion of the video data associated with the target characteristic.

Example 42 includes the non-transitory computer readable medium as defined in any one of examples 37-41, wherein the instructions further cause the at least one processor to adjust the operation of the device by adjusting a resolution of the video data rendered by the device.

Example 43 includes the non-transitory computer readable medium as defined in any one of examples 37-42, wherein the instructions further cause the at least one processor to adjust the operation of the device by adjusting a number of compute elements within a graphics engine used to render the video data.

Example 44 includes the non-transitory computer readable medium as defined in any one of examples 37-43, wherein the instructions further cause the at least one processor to adjust the operation of the device to change a focus of the camera.

Example 45 includes the non-transitory computer readable medium as defined in any one of examples 35-44, wherein the instructions further cause the at least one processor to adjust the operation of the device by adjusting an operational parameter associated with a component of the device, the operational parameter corresponding to at least one of a power state, a voltage level, a power gating, a clock rate, or a frequency.

Example 46 includes the non-transitory computer readable medium as defined in any one of examples 35-45, wherein the instructions further cause the at least one processor to determine, via the AI engine, a current state of the device, determine, via the AI engine, a predicted state of the device based on the current state and a profile of the device, the profile defining different states of the device and probabilities of transitions between different ones of the different states, and determine the context of the device based on at least one of the current state of the device or the predicted state of the device.

Example 47 includes the non-transitory computer readable medium as defined in example 46, wherein the instructions further cause the at least one processor to adjust the operation of the device based on the predicted state of the device.

Example 48 includes the non-transitory computer readable medium as defined in any one of examples 46 or 47, wherein the instructions further cause the at least one processor to estimate a battery life of the device based on the current and predicted states of the device.

Example 49 includes the non-transitory computer readable medium as defined in any one of examples 46-48, wherein the instructions further cause the at least one processor to generate, via the AI engine, the profile of the device by identifying different activities of the device, classifying the different activities to define the different states, identifying the transitions between the different ones of the different states, and calculating the probabilities of the transitions.

Example 50 includes the non-transitory computer readable medium as defined in example 49, wherein the different activities correspond to at least one of different operations of the device or different software applications being implemented on the device.

Example 51 includes the non-transitory computer readable medium as defined in any one of examples 49 or 50, wherein the instructions further cause the at least one processor to monitor a duration of the different activities between different ones of the transitions, and calculate different probabilities for ones of the transitions based on the duration of the different activities.

Example 52 includes a method comprising determining, via an artificial intelligence (AI) engine, a context of a device, and adjusting an operation of the device based on an expected change in the context of the device, the adjustment to modify at least one of a computational efficiency of the device, a power efficiency of the device, or a memory response time of the device.

Example 53 includes the method as defined in example 52, wherein the context is determined based on sensor data collected from a sensor and usage data monitored by a usage monitor, the sensor data to be processed by the device, the usage data indicative of usage of components associated with the device.

Example 54 includes the method as defined in example 53, further including determining the context of the device based on content of video data.

Example 55 includes the method as defined in example 54, further including determining the context of the device based on a lighting condition associated with an environment surrounding the device, the lighting condition defined by the sensor data.

Example 56 includes the method as defined in any one of examples 54 or 55, further including detecting, via the AI engine, a target characteristic of the content of the video data, the target characteristic defined by the usage data, and determining the context of the device based on the detection of the target characteristic.

Example 57 includes the method as defined in example 56, wherein the target characteristic corresponds to a subject matter of the content of the video data.

Example 58 includes the method as defined in example 57, further including adjusting the operation of the device by causing the device to render a first portion of the video data with a first resolution and to render a second portion of the video data with a second resolution, the second resolution lower than the first resolution, the first portion of the video data associated with the target characteristic.

Example 59 includes the method as defined in any one of examples 54-58, further including adjusting the operation of the device by adjusting a resolution of the video data rendered by the device.

Example 60 includes the method as defined in any one of examples 54-59, further including adjusting the operation of the device by adjusting a number of compute elements within a graphics engine used to render the video data.

Example 61 includes the method as defined in any one of examples 54-60, further including adjusting the operation of the device to change a focus of a camera.

Example 62 includes the method as defined in any one of examples 52-61, further including adjusting the operation of the device by adjusting an operational parameter associated with a component of the device, the operational parameter corresponding to at least one of a power state, a voltage level, a power gating, a clock rate, or a frequency.

Example 63 includes the method as defined in any one of examples 52-62, further including determining a current state of the device, determining a predicted state of the device based on the current state and a profile of the device, the profile defining different states of the device and probabilities of transitions between different ones of the different states, and determining the context of the device based on at least one of the current state of the device or the predicted state of the device.

Example 64 includes the method as defined in example 63, further including adjusting the operation of the device based on the predicted state of the device.

Example 65 includes the method as defined in any one of examples 63 or 64, further including estimating a battery life of the device based on the current and predicted states of the device.

Example 66 includes the method as defined in any one of examples 63-65, further including generating, via the AI engine, the profile of the device by identifying different activities of the device, classifying the different activities to define the different states, identifying the transitions between the different ones of the different states, and calculating the probabilities of the transitions.

Example 67 includes the method as defined in example 66, wherein the different activities correspond to at least one of different operations of the device or different software applications being implemented on the device.

Example 68 includes the method as defined in any one of examples 66 or 67, further including monitoring a duration of the different activities between different ones of the transitions, and calculating different probabilities for ones of the transitions based on the duration of the different activities.

Example 69 includes the method as defined in any one of examples 52-68, further including identifying, via the AI engine, different states of device activity for the device, the context of the device determined based on a current state identified from among the different states, determining operational parameters for the device associated with the different states, and redesigning circuits of the device for a new device based on interrelationships of the operational parameters associated with different components of the device operated during different ones of the different states.

Example 70 includes a non-transitory computer readable medium comprising instructions that, when executed, causes a machine to at least perform the methods of any one of examples 52-69.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A computing device comprising:
    a hardware platform; and
    an artificial intelligence (AI) engine to:
        determine a current operational state of the device;
        determine a predicted operational state of the device based on the current operational state and a profile of the device, the profile to define different operational states of the device and to define weights for different transitions between different ones of the different operational states, the weights indicative of probabilities of occurrences of particular ones of the different transitions when the device is in associated ones of the different operational states;
        determine a context of the device based on at least one of the current operational state of the device or the predicted operational state of the device; and
        adjust an operation of the hardware platform based on an expected change in the context of the device, the expected change associated with the predicted operational state of the device, the adjustment to modify at least one of a computational efficiency of the device, a power efficiency of the device, or a memory response time of the device.

2. The computing device as defined in claim 1, further including:
    a communications interface to receive sensor data from a sensor, the sensor data to be processed by the hardware platform; and
    a usage monitor to monitor usage data associated with the device, the usage data indicative of usage of components associated with the device.

3. The computing device as defined in claim 2, wherein the sensor is a camera and the sensor data is video data, the context of the device based on content of the video data.

4. The computing device as defined in claim 3, wherein the context of the device is based on a lighting condition associated with an environment surrounding the device, the lighting condition defined by the sensor data.

5. The computing device as defined in claim 3, wherein the AI engine is to:
    detect a target characteristic of the content of the video data, the target characteristic defined by the usage data; and
    determine the context of the device based on the detection of the target characteristic.

6. The computing device as defined in claim 5, wherein the target characteristic corresponds to a subject matter of the content of the video data.

7. The computing device as defined in claim 3, wherein the AI engine is to adjust the operation of the hardware platform by adjusting a number of compute elements within a graphics engine used to render the video data.

8. The computing device as defined in claim 1, wherein the AI engine is to adjust the operation of the hardware platform by adjusting an operational parameter associated with a component of the hardware platform, the operational parameter corresponding to at least one of a power state, a voltage level, a power gating, a clock rate, or a frequency.

9. The computing device as defined in claim 1, wherein the AI engine is to adjust the operation of the hardware platform based on the predicted operational state of the device.

10. The computing device as defined in claim 1, wherein the AI engine is to estimate a battery life of the device based on the current and predicted operational states of the device.

11. The computing device as defined in claim 1, wherein the AI engine is to adjust the operation of the hardware platform before the device transitions to the predicted operational state.

12. The computing device as defined in claim 1, wherein the probabilities of the particular ones of the different transitions depend on a duration that the device remains in the associated ones of the different operational states before the particular ones of the different transitions occur.

13. The computing device as defined in claim 1, wherein the AI engine is to adjust the operation of the hardware platform to achieve a target metric corresponding to at least one of the computational efficiency of the device, the power efficiency of the device, or the memory response time of the device.

14. A computing device comprising:
    a graphics engine;
    a communications interface to obtain video data from a camera, the video data to be processed by the graphics engine;
    a usage monitor to monitor usage data associated with the device, the usage data indicative of usage of components associated with the device; and
    an artificial intelligence (AI) engine to:
        detect a target characteristic of content of the video data, the target characteristic defined by the usage data, the target characteristic corresponding to a subject matter of the content of the video data;
        determine a context of the device based on the detection of the target characteristic; and adjust an operation of the graphics engine based on an expected change in the context of the device by causing the graphics engine to render a first portion of the video data with a first resolution and to render a second portion of the video data with a second resolution, the second resolution lower than the first resolution, the first portion of the video data associated with the target characteristic, the adjustment to modify at least one of a computational efficiency of the device, a power efficiency of the device, or a memory response time of the device.

15. The computing device as defined in claim 14, wherein the AI engine is to adjust the operation of the graphics engine by adjusting a resolution of the video data rendered by the graphics engine.

16. A non-transitory computer readable medium comprising instructions that, when executed, cause at least one processor to at least:
execute an artificial intelligence (AI) engine to:
determine a current operational state of a device;
determine a predicted operational state of the device based on the current operational state and a profile of the device, the profile to define different operational states of the device and to define weights for different transitions between different ones of the different operational states, the weights indicative of probabilities of occurrences of particular ones of the different transitions when the device is in associated ones of the different operational states; and
determine a context of the device based on at least one of the current operational state of the device or the predicted operational state of the device; and
adjust an operation of the device based on an expected change in the context of the device, the expected change associated with the predicted operational state of the device, the adjustment to modify at least one of a computational efficiency of the device, a power efficiency of the device, or a memory response time of the device.

17. The non-transitory computer readable medium as defined in claim 16, wherein the instructions cause the at least one processor to determine the context based on sensor data collected from a sensor and usage data monitored by a usage monitor, the sensor data to be processed by the device, the usage data indicative of usage of components associated with the device.

18. The non-transitory computer readable medium as defined in claim 16, wherein the instructions further cause the at least one processor to adjust the operation of the device by adjusting an operational parameter associated with a component of the device, the operational parameter corresponding to at least one of a power state, a voltage level, a power gating, a clock rate, or a frequency.

19. The non-transitory computer readable medium as defined in claim 16, wherein the instructions further cause the at least one processor to adjust the operation of the device based on the predicted operational state of the device.

20. A method comprising:
determining a current operational state of a device;
determining, via an artificial intelligence (AI) engine, a predicted operational state of the device based on the current operational state and a profile of the device, the profile to define different operational states of the device and to define weights for different transitions between different ones of the different operational states, the weights indicative of probabilities of occurrences of particular ones of the different transitions when the device is in associated ones of the different operational states;
determining, via the AI engine, a context of the device based on at least one of the current operational state of the device or the predicted operational state of the device; and
adjusting an operation of the device based on an expected change in the context of the device, the expected change associated with the predicted operational state of the device, the adjustment to modify at least one of a computational efficiency of the device, a power efficiency of the device, or a memory response time of the device.

21. The method as defined in claim 20, further including determining the context based on sensor data collected from a sensor and usage data monitored by a usage monitor, the sensor data to be processed by the device, the usage data indicative of usage of components associated with the device.

22. The method as defined in claim 20, further including adjusting the operation of the device by adjusting an operational parameter associated with a component of the device, the operational parameter corresponding to at least one of a power state, a voltage level, a power gating, a clock rate, or a frequency.

23. The method as defined in claim 20, further including adjusting the operation of the device based on the predicted operational state of the device.

24. The method as defined in claim 20, further including estimating a battery life of the device based on the current and predicted operational states of the device.

25. The method as defined in claim 20, further including:
identifying, via the AI engine, the different operational states of the device;
determining operational parameters for the device associated with the different operational states; and
redesigning circuits of the device for a new device based on interrelationships of the operational parameters associated with different components of the device operated during different ones of the different operational states.

* * * * *